R. DINSMORE.
AUTOMATIC VEHICLE BRAKE.
APPLICATION FILED MAR. 6, 1918.
1,293,728.
Patented Feb. 11, 1919.
2 SHEETS—SHEET 1.
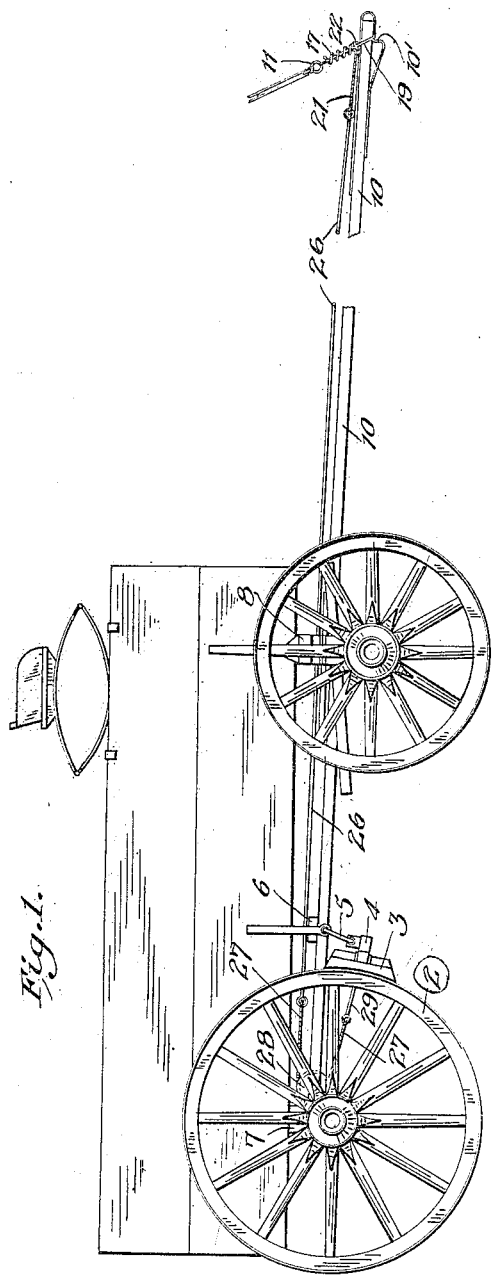
INVENTOR.
Raymond Dinsmore
BY
Charles E. Lane
ATTORNEY.

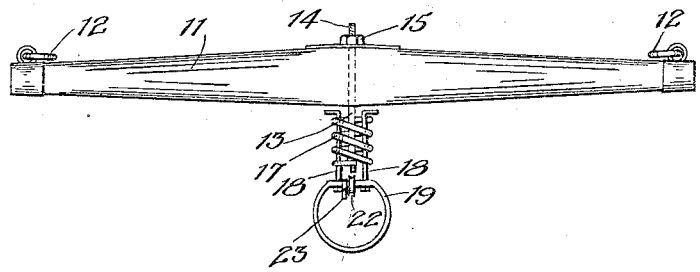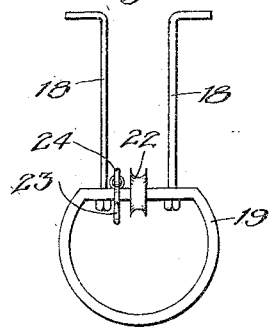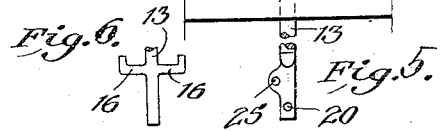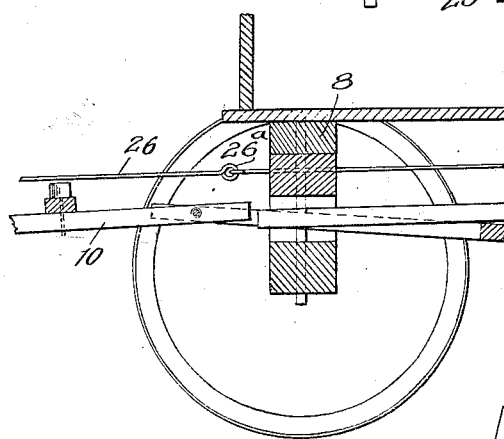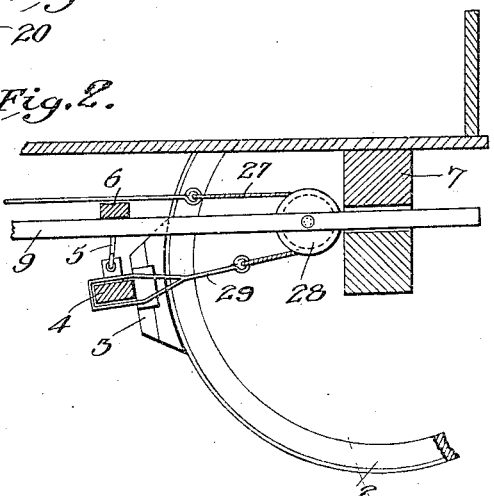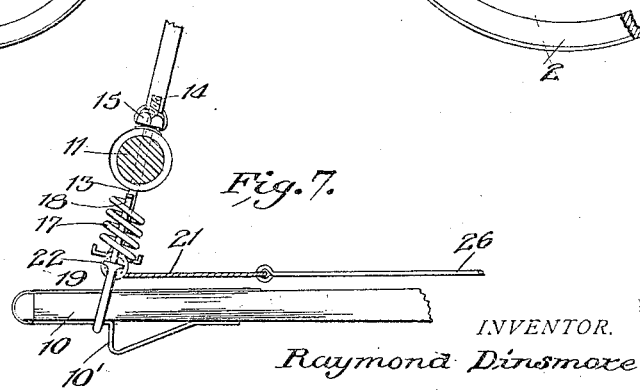

UNITED STATES PATENT OFFICE.

RAYMOND DINSMORE, OF DIVIDE, WYOMING, ASSIGNOR OF ONE-HALF TO FRANK O. OSBORN, OF HILLSDALE, WYOMING.

AUTOMATIC VEHICLE-BRAKE.

1,293,728.　　　　　　　Specification of Letters Patent.　　　Patented Feb. 11, 1919.

Application filed March 6, 1918.　Serial No. 220,835.

*To all whom it may concern:*

Be it known that I, RAYMOND DINSMORE, a citizen of the United States of America, residing at Divide, in the county of Laramie and State of Wyoming, have invented certain new and useful Improvements in Automatic Vehicle-Brakes, of which the following is a specification.

This invention relates to vehicle brakes and particularly to a brake for horse-drawn vehicles.

It is one of the objects of the present invention to provide a simple, practicable, automatically acting, reliable, and efficient device by which the progress of a vehicle may be stopped by the pulling back action of the horse or horses connected to the neck yoke of the vehicle.

It is another object of the present invention to provide a draft animal applied vehicle brake and to provide also for the prevention of the application of the brake by the draft animals when so desired.

It is a further object of the present invention to provide for the adaptation to an ordinary vehicle with but very little alteration or adjustment thereto of a draft animal applied braking device.

With these and other objects in view as will be readily manifest to those versed in the art, the invention consists in the construction, the combination and in details as more particularly described hereinafter with relation to an embodiment of the invention illustrated in the accompanying drawings in which:

Figure 1 is a side elevation of a wagon to which the automatic brake is shown as applied.

Fig. 2 is a vertical sectional and partially elevational view of the vehicle partly broken away and showing a portion of the brake mechanism applied thereto.

Fig. 3 is an elevation of the neck yoke and yoke ring coupled together by a yielding device forming a part of the brake mechanism.

Fig. 4 is an enlarged detail view of the yoke ring with the spring stops and attached parts.

Fig. 5 is a detail showing a fragment of the neck yoke to which the spring bar is connected.

Fig. 6 is a side elevation of the lower portion of the spring bar, and

Fig. 7 is a detail view of the front end of the wagon tongue and the brake connections to the neck yoke, the latter being shown in transverse section.

While the invention may be readily adapted to various types of animal drawn vehicles, it is shown here as applied to an ordinary four-wheeled box wagon to the rear wheels 2 of which there is adapted to be applied any suitable form of brakes 3 which are connected to a transverse brake bar 4 which in turn is pivotally connected by links 5 to a suitable supporting device indicated at 6. The rear bolster 7 and the front bolster 8 may be connected by a reach rod 9, and the front bolster is shown as provided with a tongue 10 of suitable or usual form.

The present invention relates particularly to the combination with the vehicle of a brake organization which is capable of being automatically applied by the rearward pull of the animals on the neck yoke 11, which may be connected to the harness in the usual or any suitable manner, as, for instance, by connection with harness rings 12. Extending through the central portion of the neck yoke 10 there is shown what will be termed the spring rod 13 having its upper end threaded at 14 to receive a nut 15 whereby the length of the lower projecting portion of the spring rod may be varied. This rod is provided at its lower end with a pair of transversely extending shoulders 16, which form seats bearing a compression spring 17, the upper end of which is supported on the outwardly turned seat portions of rods 18 which are shown in Fig. 4 as extending upwardly from the flattened side of the neck ring 19, which is adapted to be passed over the front end of the tongue 10, Figs. 1 and 7. The lower end of the spring rod 13 below its shoulders 16 is shown as provided with an aperture 20 to receive the adjacent end of a short piece of cable or other flexible element indicated at 21, which is passed downwardly around a pulley or guide roller 22 mounted on the flat side of the ring 19. Connected to this ring 19 and shown as located beside the pulley 22, there is a suitable hook 23, which is adapted to be swung upwardly about its pivotal connection as the eye 24 to engage with an aperture 25 provided to receive it in the lower end of the spring rod 13.

From the above, it will be seen that the spring 17 is adapted to be compressed between the shoulders or seats 16 on the lower end of the spring rod and the upper shoulders formed on the ends of the rods 18 extending up from the neck yoke ring. The compression of the spring 17 may be varied or adjusted simply by turning the nut 15 on the threaded end 14 of the spring rod.

After passing around the roller or guide sheave 22, the short piece of cable 21 is connected to the front end of a draft rod 26 and extending rearwardly along and above the tongue 10, preferably being jointed as at 26ª, Fig. 2. Thence the rod extends rearwardly along the reach 9 and is connected at its rear end to a short flexible member in the form of a piece of cable 27, which passes around a guide sheave or pulley 28, which may be attached to any suitable or convenient portion of the running gear at a location in the rear of the brake rod 4, it being shown in this instance as mounted in the rear portion of the reach rod just in front of the rear bolster 7. After passing around the pulley 28 the lower front end of the connection 27 is attached through any suitable link device as 29 to the brake rod 4.

In operation when the draft animals harnessed to the vehicles pull back on the neck yoke, this causes an elongation of the connection therewith to the neck yoke with the result that there is a pull through means of the spring rod 13 on the flexible connecting device comprising the elements 21, 26 and 27, which are connected by link 29 to the brake bar 4, and the brakes are pulled back on to the wheels. The rearward slipping movement of the neck yoke ring 19 is limited by engagement with a shoulder 10', Fig. 7, fastened to the lower side of the end of the tongue. In case it is desired to back the vehicle with the draft animals, it is only necessary to throw the hook 23 into engagement with the lower end of the rod 13, the hook being passed through the aperture 25 therefor. This serves to prevent the elongation of the connecting device between the neck yoke and the neck yoke ring and then when there is a back pulling action by the rearward movement is transmitted by the engagement of the neck yoke ring against the stop or shoulder 10' on the tongue.

What I claim is:

1. In a vehicle, the combination with the brake gear thereof, the tongue and the neck yoke, of a neck yoke ring to engage the tongue, said ring having parallel bars extending from one side in the plane of the ring, a rod passing through the neck yoke and lying between the bars, an expansion spring supported on the bars and connecting the yoke and the ring and normally contracting the parts relatively, and means connecting the brake gear and the yoke rod whereby upon relative extension of the rod and bars the brakes are applied.

2. In a vehicle, the combination with the brake gear, the tongue and the neck yoke, of a neck yoke ring penetrated by the tongue and having, extended from one side, spring supports; a yoke rod lying between the supports; an expansion spring confined between the supports and rod and compressible thereon; and a flexible connection passing through the ring and connecting the rod and the brake gear so that a back pull on the yoke applies the brakes.

3. In a vehicle, the combination with the brake gear thereof, the tongue and the neck yoke, of a yoke ring to engage the tongue, said ring having parallel bars extending from one side in the plane of the ring, a rod passing through the neck yoke and lying between the bars, an expansion spring supported on the bars and connecting the yoke and the ring and normally contracting the parts relatively, and means connecting the gear and the yoke rod whereby upon relative extension of the rod and bars the brakes are applied, the ring having a hook to engage the rod for preventing application of the brakes.

4. In a vehicle, the combination with the brake gear, the tongue and the neck yoke, of a neck yoke ring penetrated by the tongue and having, extended from one side, spring supports; a yoke rod lying between the supports; an expansion spring confined between the supports and rod and contracting therein, a flexible connection passing through the ring and connecting the rod and the brake gear so that a back pull on the yoke applies the brakes, the ring having a flattened side on which the supports are arranged, and a pulley on the flat side over which the said connection runs.

In testimony whereof I affix my signature.

RAYMOND DINSMORE.

Copies of this patent may be obtained for five cents each, by addressing the "Commissioner of Patents, Washington, D. C."